(12) United States Patent
Henderson

(10) Patent No.: US 6,647,109 B1
(45) Date of Patent: Nov. 11, 2003

(54) NETWORK TELEPHONY

(75) Inventor: P. Michael Henderson, Tustin, CA (US)

(73) Assignee: Conexant Systems, Inc., Newport Beach, CA (US)

(*) Notice: Subject to any disclaimer, the term of this patent is extended or adjusted under 35 U.S.C. 154(b) by 672 days.

(21) Appl. No.: 09/620,871

(22) Filed: Jul. 21, 2000

(51) Int. Cl.[7] .................................................. H04M 7/00
(52) U.S. Cl. ................................... 379/219; 379/220.01
(58) Field of Search ........................... 379/201.03, 219, 379/220.01, 221.15, 221.01

(56) References Cited

U.S. PATENT DOCUMENTS

| | | | | |
|---|---|---|---|---|
| 5,940,479 A | * | 8/1999 | Guy et al. ............... | 379/93.01 |
| 6,055,575 A | * | 4/2000 | Paulsen et al. ........... | 709/229 |
| 6,079,020 A | * | 6/2000 | Liu .......................... | 713/201 |
| 6,125,108 A | * | 9/2000 | Shaffer et al. ............ | 379/201 |
| 6,529,513 B1 | * | 3/2003 | Howard et al. .......... | 379/93.02 |

* cited by examiner

*Primary Examiner*—Creighton Smith
(74) *Attorney, Agent, or Firm*—Farjami & Farjami LLP

(57) ABSTRACT

A telephony system and method for providing telephony services to remote users. The telephony system comprises a user side and a provider side. The user side includes a telephony instrument and a personal computer for establishing communication with the provider side via a communication gateway, a communication device and a wide area network, such as the Internet. The provider side includes a virtual private network in communication with the wide area network and a communication network. The communication network is in communication with a telephony server interfacing with a telephone switched system. The telephone switched network provides telephone lines for allocation of the telephone lines by the virtual private network to the remote users.

34 Claims, 5 Drawing Sheets

NETWORK TELEPHONY

BACKGROUND OF THE INVENTION

1. Field of the Invention

The present invention relates generally to communication systems. More particularly, the present invention relates to networks and telephony systems.

2. Background

Today, more and more people are working from home. Sometimes it is just extending work hours, as when an employee checks e-mail from home, but other times an employee works normal hours at home to lessen interruptions, take care of a family member, or to avoid commuting problems.

This trend is also gaining ground among employers. Employers in support of the work-at-home trend believe that flexible work policies can aid recruiting, especially in tight labor markets. But even more important, employers have found that employees work more hours and more efficiently when they have access from home, leading to higher productivity.

In addition to the work-at-home work force, many employees spend days outside of the office due to travelling needs of today's global business environment. To support off-site employees, many companies are providing a variety of tools to facilitate such employees' access to the company local area network ("LAN"). The latest is Virtual Private Networking ("VPN")combined with broadband access or high-speed residential access, such as Digital Subscriber Line ("DSL")or access via cable modems. VPNs provide the ability to gain full access to corporate data while maintaining security through authentication and encryption. As a result, employees can send and receive e-mails, essentially in real time, and access the corporate LAN.

However, telephony remains the missing component. In other words, employees who are out of the office, because they are either travelling or are working at home, must inform others of their absence from the office and provide an access number. While it is possible to inform a small circle of fellow employees, it is impossible to inform everyone—many callers will simply reach voicemail when they call the employee's office number.

The conventional solution for the work-at-home employees is to install a new telephone line off of the company's Private Branch Exchange ("PBX")at the employee's home. FIG. 1 depicts this conventional approach.

FIG. 1 illustrates a block diagram of a telephone system 100. As shown, the central office ("CO")provides telephone lines 118 to a company PBX 120. The CO is the front line of the telecommunications network and may be described as a network node on the PSTN ("Public Switched Telephone Network"). The PBX 120 is an in-house telephone switching system that many companies use to interconnect telephone extensions to each other, as well as to the outside telephone network. The PBX 120 may include functions such as least cost routing for outside calls, call forwarding, conference calling and call accounting. Modem PBXs use all-digital methods for switching and may support both digital terminals and telephones, along with analog telephones.

As shown, the PBX 120 includes extensions 122 and 132, which are connected to internal telephones 125 and 130, respectively, for at-work employees. The PBX 120 also includes extension 135, which is routed to the CO, from where the extension 135 is further routed to employee's home 105. The extension 135 is then connected to an at-home telephone 110 for employee's use. As a result, the employee may transfer his office extension, e.g. extension 122; to his at-home extension 135 and receive calls at home. Also, the employee may originate calls from home using the PBX extension 135.

The conventional approach, however, has many drawbacks and is impractical. For example, the conventional approach is costly, since it involves initial setup charges as well as monthly payments for receiving a leased line from the CO. Also, the PBX extension 135 is tied to a physical location, e.g., employee's home 135. As a result, a travelling employee cannot benefit from the conventional approach due to its inflexibility. Even more, calls originated from employee's at-home extension would indicate to the recipient, through caller identification information that the employee is not at work by displaying an extension number different than employee's at-work extension number.

An ideal solution would be to move the employee's PBX office extension to the employee's physical location when the employee is off site, on ad hoc basis and without the need for additional wiring or recurring costs of maintaining physical wires. It is also desirable for an employee to transfer his PBX office extension to an off-site location, but at the same time appear that the employee's calls are originating from the employee's on-site or office extension.

Accordingly, there is an intense need in the art for systems and methods which can provide virtual extensions to any off-site location, on ad hoc basis, with various features such as virtual extensions appearing as on-site extensions, and further, an ability to move the employee's office extension to wherever the employee may be physically located.

SUMMARY OF THE INVENTION

In accordance with the purpose of the present invention as broadly described herein, there is provided a telephony method and system.

According to one aspect of the present invention, a user may establish a communication link with a telephony provider through a communication gateway, a communication device and a wide area network, such as the Internet, to obtain telephony service from the telephony provider. The telephony provider includes a VPN gateway in communication with the wide area network and a communication network. which communication network is in communication with a telephony server. The telephony provider further includes a telephone switching system in communication with the telephony server. The telephone switching system provides at least one telephone line for allocation by the VPN gateway.

The user establishes a connection with the VPN gateway via the wide area network using a personal computer in communication with the communication gateway and the communication device. In one aspect of the present invention, the personal computer may establish a connection with the VPN gateway using a high-speed access device, or in another aspect, using an analog modem capable of simultaneous transmission of data and digitally encoded voice signals over the PSTN. The user may then establish a connection with the communication network via the VPN gateway, for example, through a log-on technique. After a data connection is established between the communication network and the personal computer, the user may then log into the telephony portion of the communication network, which may involve additional security layers, and request a telephony service. In one aspect of the present invention, after establishing the data connection, the communication network may automatically proceed with providing a telephony service to the user, since the user is identified as part of the data log-on process.

In another aspect, the user may be asked to enter his/her internal extension number. The VPN gateway may then instruct the telephony server to start monitoring the user's internal extension for status changes and inform the VPN gateway of such status changes. In one aspect of the present invention, at this point, the VPN gateway may allocate one of the VPN phone lines to the user through the wide area network, the communication device and the communication gateway. In another aspect, the VPN gateway may allocate a VPN phone line to the user on a need to use basis.

In one aspect of the present invention, if the telephony server receives a status change notification indicating an incoming call on the user's internal extension, the telephony server informs the VPN gateway of the incoming call. In turn, the VPN gateway allocates one available VPN phone line to the user for the purpose of transferring the incoming call. The VPN gateway then establishes a logical connection with the communication gateway and sends information regarding the incoming call to the communication gateway, which is in communication with a telephony instrument.

In yet one aspect, the user may choose not to answer the incoming call and allow the communication gateway to send a message to the VPN gateway requesting that the incoming call be transferred to the user's voicemail on the internal extension.

In another aspect of the present invention, the user may initiate a telephone call by taking the telephony instrument connected to the communication gateway off-hook. In that event, the communication gateway detects the off-hook status and proceeds to-establish a logical connection with the VPN gateway and send a message to the VPN gateway to advise the VPN gateway that the user would like to establish a telephony connection. The VPN gateway then allocates one available VPN phone line to the user. Once a VPN phone line is allocated, a dial tone is generated on the telephone for the user. After receiving the dial tone, the user starts dialing a telephone number, which number is sent to the VPN gateway. The VPN gateway requests that the telephony server command the PBX to dial the number using the user's internal extension. In another aspect, the number may be dialed using the VPN phone line itself. In yet another aspect, after dialing the phone number using the user's internal extension, the telephony server may use a conference option of the telephone switching system to conference in the VPN phone line and the user's internal extension. In one aspect, the telephony server may mute the user's internal extension.

In another aspect, the telephony system of the present invention may be used to inform the user of messages on his/her internal extension via a VPN phone line. In yet another aspect, a service provider may employ the present invention to provide network and telephony services to virtual corporations and individuals.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the broadband system and/or the higher-level protocol described herein is merely one illustrative application for the present invention. Further, it should be noted that the present invention may employ any number of conventional techniques for data transmission, data protocols, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, networking protocols, authentication, encryption, training, and other functional aspects of a data communication system (and components of the individual operating components of the system) may not be described in detail herein. Furthermore, the connecting. lines shown in the various figures contained herein are intended to -represent exemplary functional relationships and/or physical couplings between the various elements. It should be noted that many alternative or additional functional relationships or physical connections may be present in a practical communication system.

Figure 1:
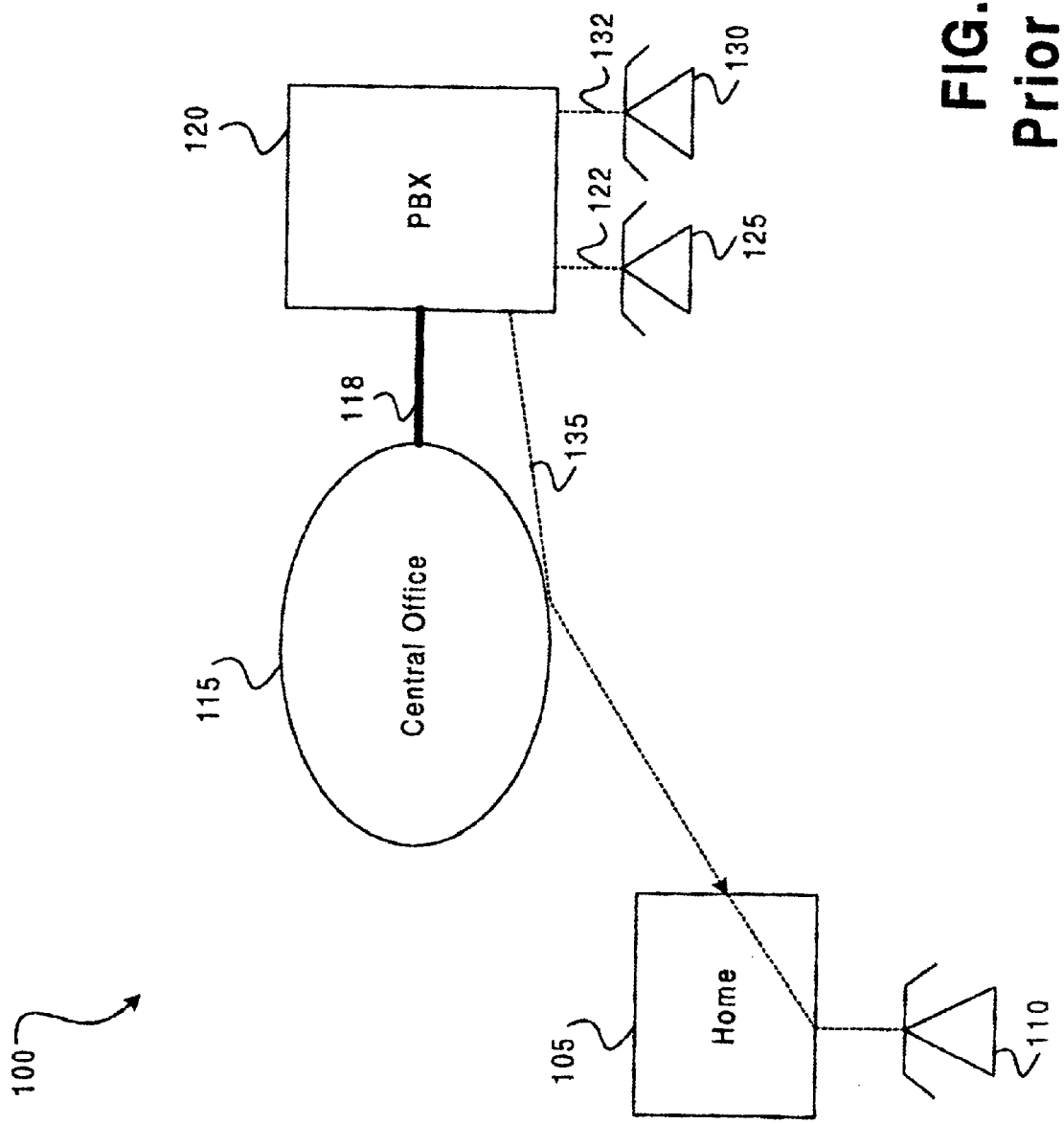
FIG. 1 is a block diagram depicting a conventional communication system for providing telephony service.
Figure 2:
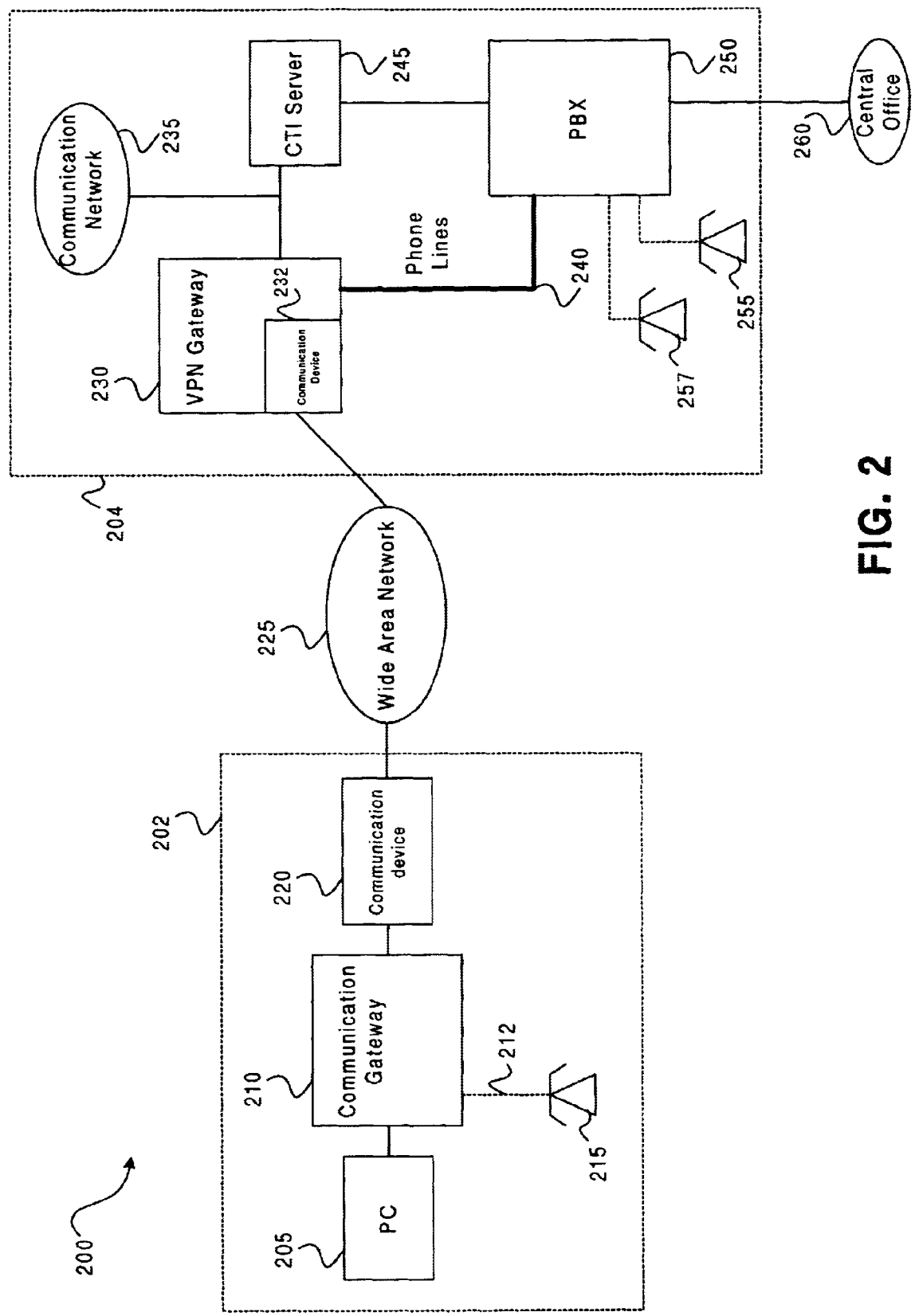
FIG. 2 is a block diagram depicting a communication system according to one embodiment of the present invention for providing telephony service.

Turning to the drawings, FIG. 2 illustrates a block diagram depicting a general communication system 200 according to one embodiment of the present invention. In one embodiment, the communication system 200 includes a user-side 202 in communication with a provider-side 204 via a wide area network 225, such as the Internet protocol ("IP")or an synchronous transfer mode ("ATM") network. The communication system 200 enables a user to obtain telephony service from a company PBX 250 through the wide area network 225. For example, an employee may. obtain telephony service at home or on the road through the Internet by connecting to the company VPN gateway 230. As shown in FIG. 2, the user-side 202 includes a personal computer ("PC")and a communication instrument 215 in communication with a communication gateway 210, such as a broadband gateway which is in turn in communication with a communication device 220, such as high speed access communication devices, which could be provided by ADSL, HDSL, G.shdsl, cable modem, fiber, wireless broadband or other. The user may also access the wide area network 225 using an analog modem, such as a V.90 modem. The communication device is further placed in communication with the wide area network 225, such as an ATM or IP network, e.g., the Internet.

As further shown in FIG. 2, the communication instrument 215 is placed in communication with the communication gateway 210 for voice communications. The communication instrument 215 may be a regular analog telephone. In that case, the communication gateway 210 includes a line card or an equivalent function for driving the analog phone. In another embodiment, the communication instrument 215 may be a custom telephone having features such as a light for indicating messages, an LCD for displaying caller identification, phone numbers, etc., a hold button, a conference button, a transfer button and the like. In such case, the telephone connection 212 may be a digital connection to the communication gateway 210, such as an Ethernet connection, a universal serial bus (USB) connection, or other digital interfaces. The communication instrument 215 may also support more than one telephone line. In other embodiments, the communication instrument 215 may be a headset connected via Bluetooth to the PC 205 or the communication gateway 210. Furthermore, the telephone connection 212 may be a wireless connection. For example, today, the third generation wireless systems are promising high-data access, therefore, a traveler may use a third generation wireless system to access the VPN gateway 230. The third generation (3G) is defined by the International Telecommunication Union under the IMT-2000 global framework and is designed for high-speed multimedia data, voice and video with advanced global roaming. As a result of the present invention, a traveler in an airport may gain access to the corporate VPN gateway and telephony system as if s/he is physically located in the office.

Turning back to FIG. 2, the provider-side 204 of the communication system 200 is in communication with the wide area network 225 via the VPN gateway 230, which includes a communication device 232. VPN is a private network that is configured within a public network. VPNs enjoy the security of a private network via access control and encryption, while taking advantage of the economies of scale and built-in management facilities of large public networks. VPNs may be built over X.25, Switched 56, frame relay and ATM technologies, with a tremendous interest in VPNs over the Internet. In short, VPN is a combination of tunneling, encryption, authentication, and access control technologies and services used to carry traffic over the Internet, a managed IP network or a provider's backbone. The traffic may reach these backbones using any combination of access technologies, including T1, frame relay, ISDN, ATM or simple dial access. The general idea behind using VPN is that a company can reduce the recurring telecommunications charges that are incurred when connecting remote users and branch offices to resources in corporate headquarters.

In one embodiment, VPN may use a security protocol called IP Security ("IPSec")from the Internet Engineering Task Force ("IETF"). The IPSec protocol is used to provide privacy and authentication services at the IP layer or over the Internet. In one embodiment, the IPSec protocol may be supported by the communication gateway 210 or the PC 205 on the user-side 202. As a result, employees may securely access the communication network 235 via the VPN gateway 230. In another embodiment, the low-level transport protocol may be ATM, although the data transport may be IP. Where ATM is used as the low-level protocol, IP will be carried over ATM.

In the communication system 200, voice may be carried in a variety of ways, including voice over IP ("VoIP")or voice over ATM ("VoATM"). Although ATM provides quality of service ("QoS"—or the ability to define a level of performance in a data communications system—ATM is not used for all types of broadband access; therefore, VoIP may be more advantageous for most designs. For example, ATM is not available for most cable systems. If ATM is available, the IP frames carrying voice can be transported over an ATM virtual circuit with QoS. However, if ATM is not available, voice functionality can still be provided, even if the resulting connection may have more delay and jitter than desired.

As shown in FIG. 2, the VPN. gateway 230 is in communication with the communication network or LAN 235 through a connection such as an Ethernet LAN. Also, one or more telephone lines 240 originating from a PBX 250 are provided for allocation by the VPN gateway 230. The telephone lines 240 may be analog telephone lines and, thus, standard analog PBX ports may be used. In other embodiments, the telephone lines 240 may be digital connections, such as T1 or ISDN BRI or PRI lines. A full T1 connection, for example, represents twenty-four PBX telephone numbers, e.g., extensions 2001 through 2024. In one embodiment, the VPN gateway 230 is capable of identifying the telephone numbers represented on the digital line by querying the PBX 250 through the digital lines. In another embodiment, the telephone numbers on the digital line may be provided to the VPN gateway through a setup procedure.

The PBX 250 is an in-house telephone switching system that interconnects telephone extensions to each other, such as telephone extensions 255 and 257, as well as to the outside telephone network, such as the CO 260. The PBX 250 may include functions such as least cost routing for outside calls, call forwarding, conference calling and call accounting. The PBX 250 may use all-digital methods for switching and may support both digital terminals and telephones along with analog telephones. The PBX 250 provides the ability to control certain telephony functions through an interface with a computer telephony integration ("CTI") server 245. Today, many major PBX manufacturers provide such an interface. For example, the interface on the Lucent Definity PBX is known as CallVisor/ASAI (adjacent switch application interface) and is physically similar to an ISDN BRI port, the Siemens/Rolm interface is known as CallBridge, while the Nortel switch interface is known as Meridian Link.

The CTI server 245 is capable of combining data with voice-systems in order to enhance telephone services. The CTI server 245 is connected to the PBX 250 via the PBX interface. Via the PBX interface and using software, the CTI server 245 can send commands to the PBX 250 and receive notifications from the PBX 250, such as status changes of monitored telephone lines or other devices. While in communication with the CTI server 245 software, the VPN gateway 230 may have the PBX 250 monitor a certain telephone line, for example, extension 1234, and advise the VPN gateway 230 of any status changes, such as outgoing calls, incoming calls, messages waiting, etc. The CTI server 245 software is typically available from the PBX manufacturer and/or third party software developers. The software on the CTI server 245 may implement an application programming interface ("API")which allows a CTI server 245. user to write programs to interface with the CTI server, 245 software. Typically, APIs are implemented by writing function calls in the program, which provide the linkage to the required subroutine for execution. A popular API is known as telephony services API ("TSAPI"). TSAPI is a telephony programming interface from Novell and, AT&T, which is based on an international standard. TSAPI is designed to interface a telephone PBX with a NetWare server to provide interoperability between PCs and telephone equipment.

Figure 3:
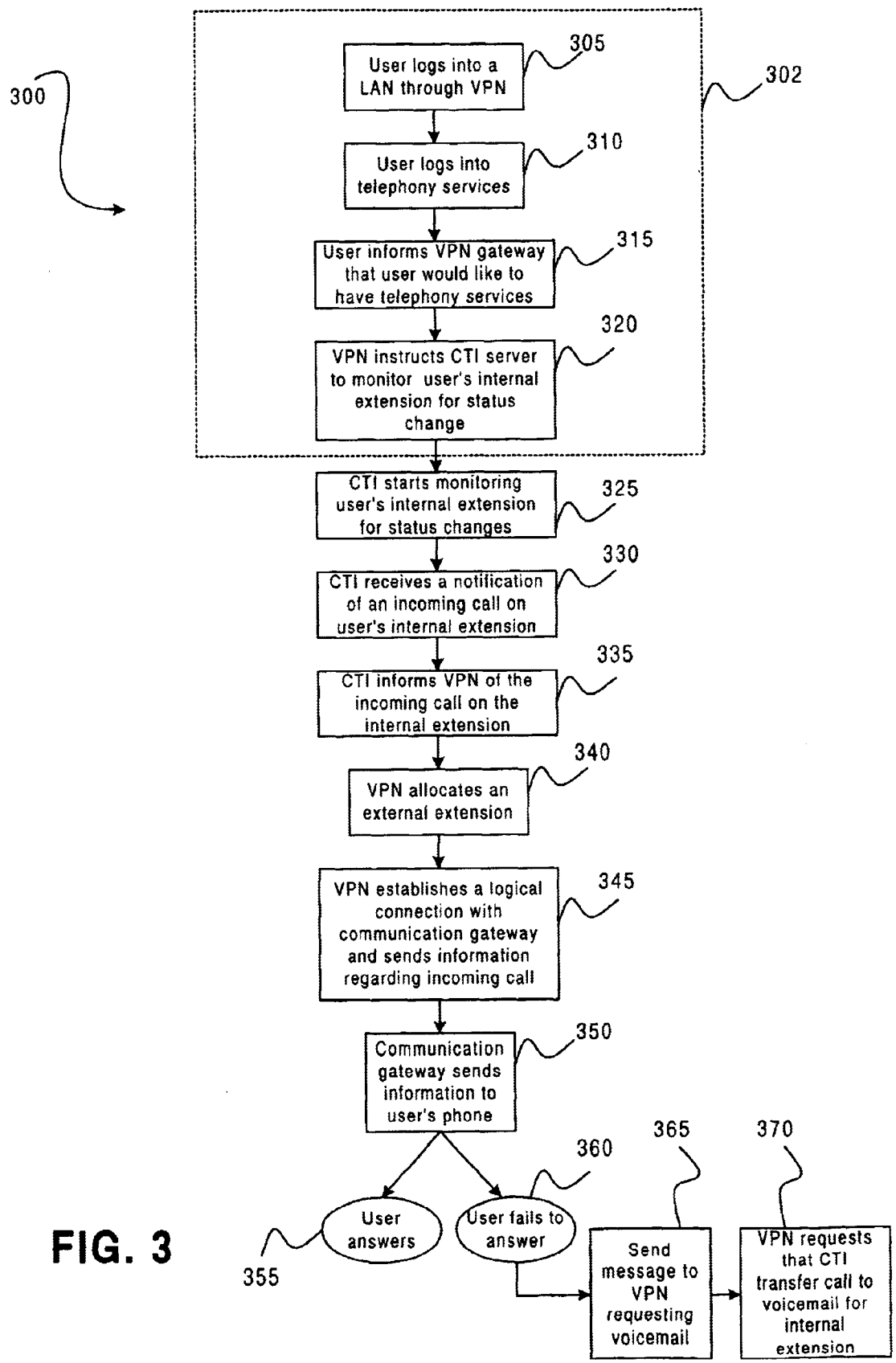
FIG. 3 is an example flow diagram for receiving a call using the communication system of FIG. 2.

Referring to FIG. 3, an example flow diagram 300 for receiving a call using the communication system 200 is shown. The flow diagram 300 begins by a telephony session establishment 302. The telephony session proceeds with a data connection establishment step 305. At step 305, a remote user connects to the VPN gateway 230 using the PC 205 via the communication gateway 210 and communication device 220. As stated above, the PC 205 may, alternatively, connect to the VPN gateway 230 using an analog modem, such as a V.90 modem. Once a secure connection, for example, via IPSec, is established, the user logs into the communication network 235 via the VPN gateway 230. At this point a data connection between the communication network 235 and the PC 205 is established. In step 310, the user logs into the telephony portion of the communication network 235, which may involve additional security layers or passwords. In step 315, the user informs the VPN gateway 230 that the user would like to receive telephony services from the provider-side 204 for the duration of the connection or a certain period of time. In some embodiments, a remote data connection may automatically proceed with a remote telephony without requiring the user to request the remote telephony and/or enter an additional password.

At this point, the VPN gateway 230 may look up the user's internal extension, e.g., extension number 1234, using the login information provided by the user. In another embodiment, the user may be asked to enter his/her extension number. In step 320, the VPN gateway 230 instructs the CTI server 245 to start monitoring the user's internal extension for status changes and inform the VPN gateway 230 of such status changes. At this point, in one embodiment, the VPN gateway 230 may allocate one available VPN phone line 240, e.g. extension 2011, to the user. In other embodiments, however, the VPN gateway 230 may allocate one available VPN phone line 240 at the time a change of status is reported and only for the duration of that change, in order to conserve VPN phone lines 240.

In step 325. the CTI server 245 starts monitoring the user's internal extension 1234, as instructed by the VPN gateway 230. In step 330, the CTI server 245 receives a notification from the PBX 250 of a call on the user's internal extension 1234, i.e., a status change on the extension 1234. The CTI server 245 may accomplish this task by, for example, using a lookup table of remote telephony, which table includes the internal extension 1234. In step 335, the CTI server 245 informs the VPN gateway of the incoming call on the extension 1234. In case no permanent VPN phone line has been allocated to the extension 1234, the VPN gateway 230 allocates one available VPN phone line 240, e.g. extension 2003, to the user for the purpose of this incoming call. The VPN gateway 230 then requests that the CTI server 245 transfer the incoming call to extension 2003. In one embodiment, in case no more VPN phone line 240 is available for allocation by the VPN gateway 230, the VPN gateway 230 requests that the CTI server 245 transfer the incoming call to the user's voicemail. In step 345, the VPN gateway 230 establishes a logical connection with the communication gateway 210 and sends information regarding the incoming call, such as caller identification, e.g., name, phone number, etc. In step 350, the communication gateway 210 sends the information to the communication instrument 215, or in another embodiment, displays the information on the PC 205 screen. At this juncture, the user may choose to answer the phone in step 355 or ignore the incoming call in step 360 based on various criteria, such as blocking certain callers or forwarding to an administrative assistant.

If the user answers the incoming call by taking the communication instrument 215 off-hook, the logical connection between the VPN gateway 230 and the communication gateway 210 is used to communicate the voice traffic, which is encoded in a suitable digital format at both ends utilizing the ITU standards for speech codecs, such as G.711, G.726, G.728, or other similar protocols. The logical connection may utilize the IP, ATM or any other protocol depending upon what protocol the wide area network 225 may support. If the user does not answer the incoming call, in one embodiment, the communication gateway 210 may send a message to the VPN gateway 230, in step 355, requesting that the incoming call be transferred to the user's voicemail on the internal extension 1234. Next, the VPN gateway 230 requests that the CTI server 245 transfer the incoming call to the user's voicemail on the internal extension 1234 and the VPN gateway 230 releases the VPN phone line 2003. In response to a suitable command from the VPN gateway 230, the CTI server 245 commands the PBX 250 to transfer the call into the user's voicemail.

Figure 4:
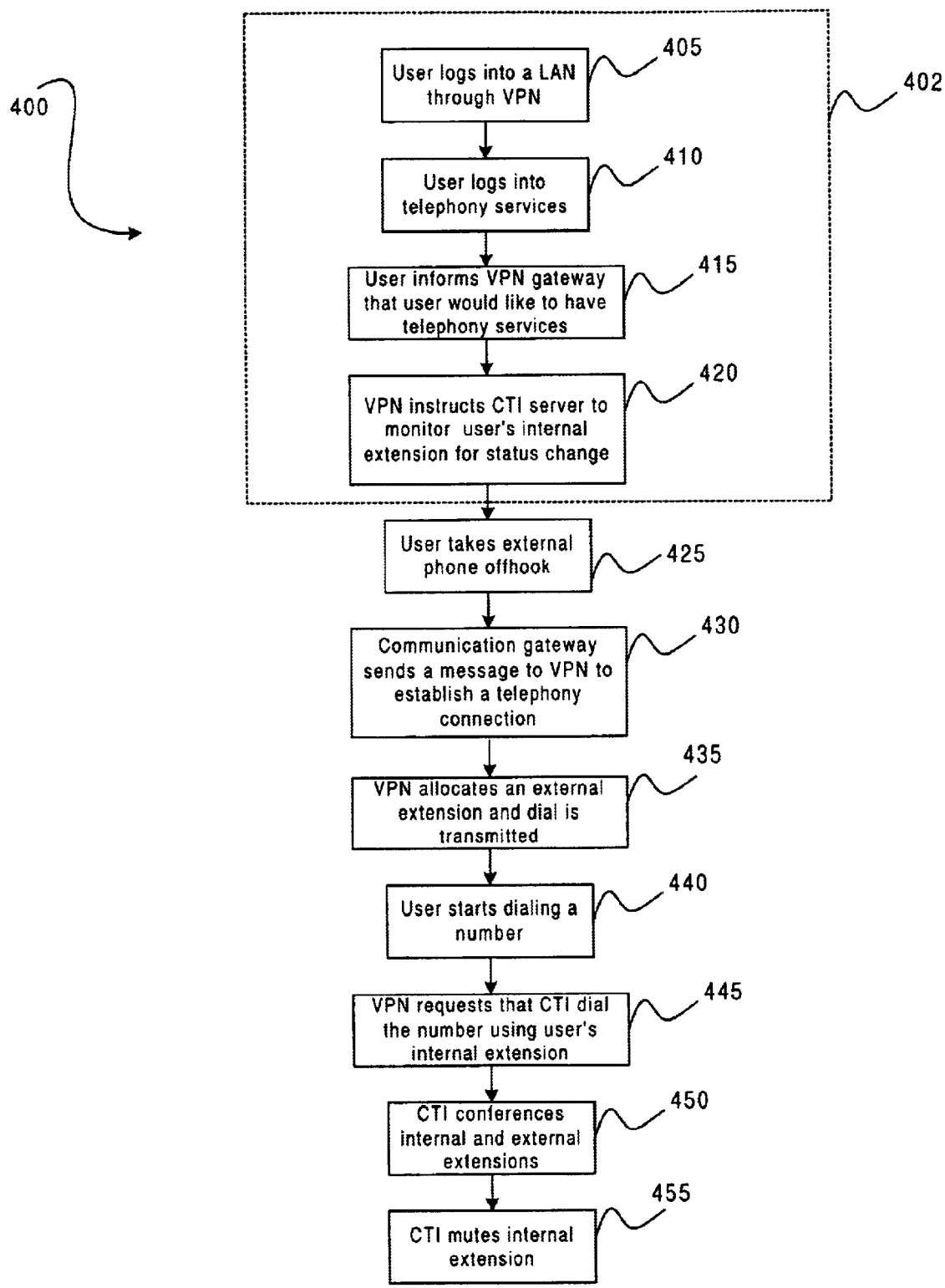
FIG. 4 is an example flow diagram for placing a call using the communication system of FIG. 2.

Turning to FIG. 4, an example flow diagram 400 for placing a call using the communication system 200 is shown. The flow diagram 400 begins by a telephony session establishment 402. The telephony session proceeds with a data connection establishment step 405. At step 405, a remote user connects to the VPN gateway 230 using the PC 205 via the communication gateway 210 and communication device 220. Once a secure a connection is established, the user logs into the communication network 235 via the VPN gateway 230. At this point a data connection between the communication network 235 and the PC 205 is established. In step 410, the user logs into the telephony portion of the communication network 235, which may involve additional security layers or passwords. In step 415, the user informs the VPN gateway 230 that the user would like to receive telephony services from the provider-side 204 for the duration of the connection or a certain period of time.

At this point, the VPN gateway 230 may look up the user's internal extension, e.g., extension number 1234, using the login information provided by the user. In step 425, the user takes the communication instrument 215 off-hook. Next, in step 430, the communication gateway 210 detects the off-hook status of the communication instrument 215, establishes a logical connection with the VPN gateway 230 and sends a message to the VPN gateway 230 to advise the VPN gateway that the user would like to establish a telephony connection. In step 435, the VPN gateway 230 allocates one available VPN phone line 240, e.g. extension 2011, to the remote user, unless a permanent phone line 240 had already been allocated to the user. In one embodiment, in case no more VPN phone line 240 is available for allocation by the VPN gateway 230, the VPN gateway 230 informs the communication gateway 210 of such situation. In that event, the communication gateway 210 may inform the user, for example, by generating a fast busy tone on the communication instrument 215.

Once a VPN phone line 240 is allocated, the VPN gateway 230 informs the communication gateway 210 of such and, in one embodiment, the communication gateway 210 generates a dial tone for the communication instrument 215. In one embodiment, the dial tone is generated by the communication gateway 210. In step 440, after receiving the dial tone, the user may start dialing a telephone number using the communication instrument 215. At this point, the communication gateway 210 sends the dialed digits to the VPN gateway 230. In one embodiment, the digits may be sent as they are entered, or yet in another embodiment, the digits may be buffered and only sent when all digits are entered. In step 445, the VPN gateway 230 requests that the CTI server 245 dial the digits using the user's internal extension 1234. As a result, it would appear to the recipient of the call that the user has originated the call from the user's internal extension. In one embodiment, the phone number may be dialed using the VPN phone line 240, i.e., extension 2011 without utilizing the CTI server 245.

In step 450, after dialing the phone number using the user's internal extension 1234, the CTI server 245 may use the conference option of the PBX 250 to conference in the VPN phone line, i.e., extension 2011 and the user's internal extension 1234. In step 455, the internal extension 1234 may be muted to provide additional security so as to prevent anyone from listening to the conversation on the internal line 1234. In some embodiments, the PBX 250 may include a spoofing feature, such that extension 2011 may appear as extension 1234 or be assigned the characteristics and properties of extension 1234 in order to eliminate the steps of dialing the phone number using extension 1234 and/or conferencing extension 2011 after dialing the phone number.

Figure 5:
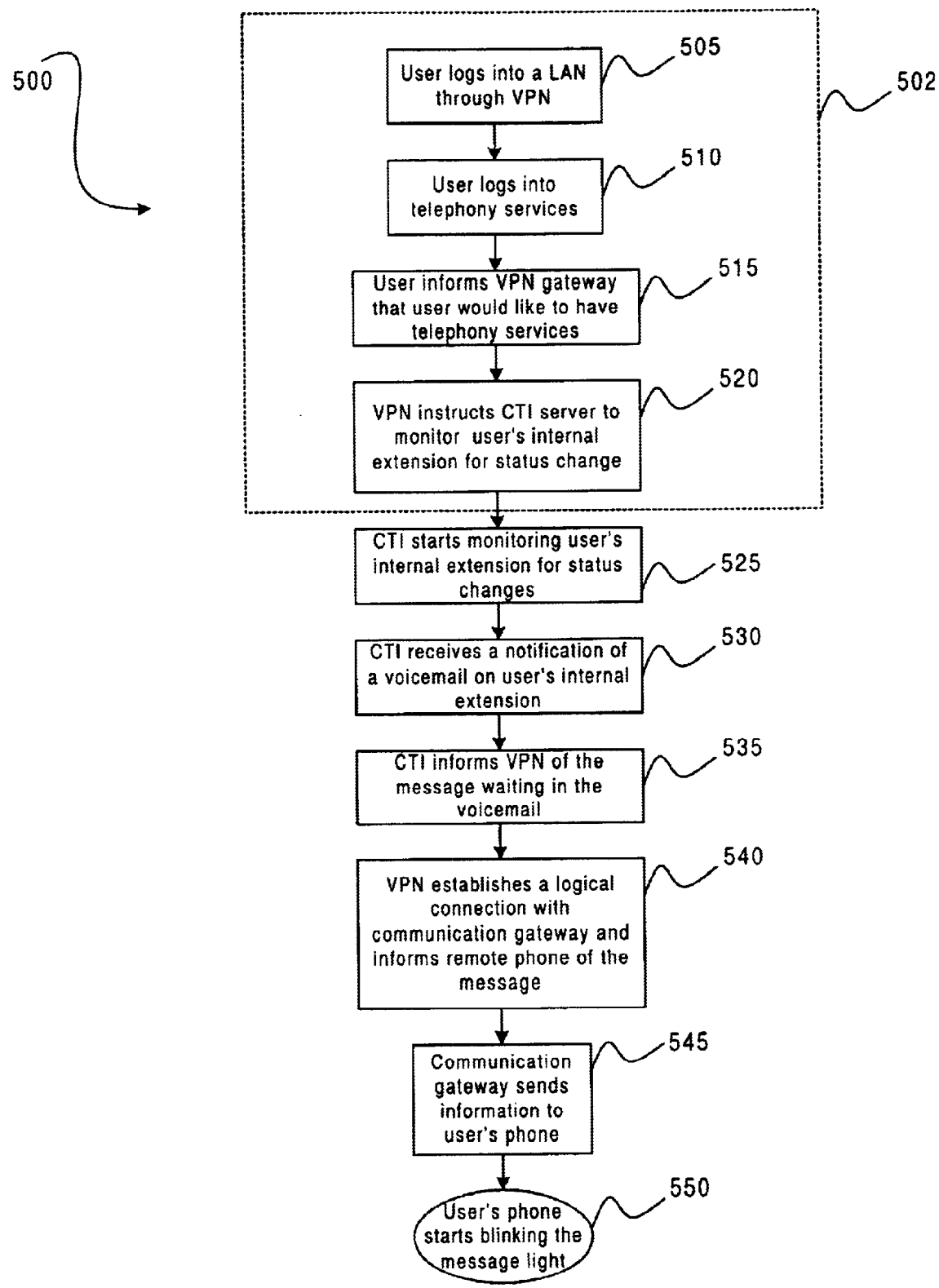
FIG. 5 is an example flow diagram for receiving a message notification using the communication system of FIG. 2.

FIG. 5 is an example flow diagram 500 for receiving a message notification using the communication system 200 is shown. The flow diagram 500 begins by a telephony session establishment 502. The telephony session proceeds with a data connection establishment step 505. At step 505, a remote user connects to the VPN gateway 230 using the PC 205 via the communication gateway 210 and communication device 220. Once a secure a connection is established, the user logs into the communication network 235 via the VPN gateway 230. At this point a data connection between the communication network 235 and the PC 205 is established. In step 510, the user logs into the telephony portion of the communication network 235, which may involve additional security layers or passwords. In step 515, the user informs the VPN gateway 230 that the user would like to receive telephony services from the provider-side 204 for the duration of the connection or a certain period of time.

At this point, the VPN gateway 230 may look up the user's internal extension, e.g., extension number 1234, using the login information provided by the user. In step 525, the CTI server 245 starts monitoring the internal extension 1234 for a status change, for example, by checking a lookup table of remote telephony numbers. At step 530, the CTI server 235 receives a notification of voicemail status change from the PBX 250 regarding a message waiting in the user's internal extension 1234 mailbox. Next, in step 535, the CTI server 245 informs the VPN gateway 230 of the status change and that a voicemail message is waiting for the user.

In step 540, the VPN gateway 230 establishes a logical connection with the communication gateway 210 and informs the communication gateway 210 that there is a voice message in the user's mailbox. Next, in step 545, the communication gateway 210 sends that information to the communication instrument 215. In step 550, the communication instrument 215 announces the information, for example by blinking a message light on the communication instrument 215, and thus notifying the user of the message. In one embodiment, the information may be sent to and displayed on the PC 205.

Among many advantages, the present invention enables employees, working at home or travelling on the road, to use the corporate telephony service remotely and exhibit the appearance that they are physically at the company. Furthermore, the present invention provides an opportunity for virtual companies. For example, a method of doing business for a service company may be to offer LAN severs and PBX functionality to virtual companies. In effect, these virtual companies may operate from home or various locations by connecting to the service company's LAN everyday to gain access to network services, such as e-mails and also telephony. Employees of a virtual company may obtain the same data and telephony services as if they were all located in one physical location.

In addition to the, call answering, call placement and messaging features of the present invention, it is understood by one of ordinary skill in the art that other telephony features, such caller-ID, call transfer, conferencing, and so forth, may also be communicated between the communication gateway 210 and CTI server 245 and the PBX 250 through similar methods defined for that purpose.

The present invention may be embodied in other specific forms without departing from its spirit or essential characteristics. The described embodiments are to be considered in all respects only as illustrative and not restrictive. Accordingly, the scope of the invention is indicated by the appended claims rather than the foregoing description. All-changes which come within the meaning and range of equivalency of the claims are to be embraced within their scope.

What is claimed is:

1. A communication system comprising:
    a first network;
    a second network;
    a first communication device providing communication between said first and second networks;
    a telephone switching system in communication with said first network and providing at least one communication line for allocation by said first network;
    wherein said first network allocates one or more of said at least one communication line for use by a communication instrument via said first communication device and said second network.

2. The communication system of claim 1, wherein a second communication device is in communication with said second network and a gateway, and wherein said communication instrument is in communication with said gateway.

3. The communication system of claim 2, wherein said gateway is in communication with a computer for establishing data communication with said first network.

4. The communication system of claim 1, wherein said first communication device is in communication with a second communication device via said second network.

5. The communication system of claim 4, wherein said second network is the Internet.

6. The communication system of claim 2, wherein said second communication device is a part of a gateway.

7. The communication system of claim 2, wherein said second communication device is in communication with a gateway.

8. The communication system of claim 6, wherein said gateway is a virtual private network gateway.

9. The communication system of claim 1 further comprising a telephony server as an interface between said first network and said telephone switching system, wherein said telephony server is capable of monitoring status changes within said telephone switching system.

10. A method of providing a telephony service, said method comprising the steps of:
   receiving a request for said telephony service by a first communication device from a second communication device;
   communicating said request by said first communication device to a first network;
   providing at least one communication line by a telephone switching system to said first network; and
   allocating one or more of said at least one communication line by said first network in response to said request for said telephony service.

11. The communication method of claim 10, wherein said first communication device is in communication with a communication instrument via a gateway.

12. The communication method of claim 11, wherein said gateway is in communication with a computer for establishing data communication with said first network.

13. The communication method of claim 10, wherein said first communication device is in communication with said second communication device via a second network.

14. The communication method of claim 13, wherein said second network is the Internet.

15. The communication method of claim 10, wherein said second communication device is a part of a gateway.

16. The communication method of claim 10, wherein said second communication device is in communication with a gateway.

17. The communication method of claim 15, wherein sad gateway is a virtual private network gateway.

18. The communication method of claim 10 further comprising the steps of:
   communicating said request by said first network to a telephony server; and
   monitoring said telephone switching system by said telephony server.

19. A method of providing telephony service, said method comprising the steps of:
   receiving a request for said telephony service for a first telephone number by a virtual private network via a first network;
   communicating said request by said virtual private network to a second network in communication with a telephony server;
   recording said request by said telephony server in communication with a telephone switching system, wherein said telephone switching system provides at least one communication line for allocation by said virtual private network;
   receiving a call on said first telephone number;
   retrieving said request by said telephony server;
   informing said virtual private network of said call by said telephony server;
   allocating one of said at least one communication line having a second telephone number by said virtual private network; and
   routing said call from said first telephone number to said second telephone number.

20. The method of claim 19 further comprising the steps of:
   receiving a transfer request by said virtual private network; and
   transferring said call by said telephony server to a message center.

21. The method of claim 19, wherein said first network is the Internet.

22. A method of providing telephony service, said method comprising the steps of:
   receiving a request for said telephony service for a first telephone number by a virtual private network via a first network;
   communicating said request by said virtual private network to a second network in communication with a telephony server in communication with a telephone switching system, wherein said telephone switching system provides at least one communication line for allocation by said virtual private network;
   receiving a call request; and
   allocating one or more of said at least one communication line by said virtual private network for said call.

23. The method of claim 22, wherein said one of said at least one communication line has a second telephone number, and wherein said method further comprises the steps of:
   placing said call on said first telephone number; and
   conferencing said second telephone number with said first telephone number.

24. The method of claim 23 further comprising a step of muting said first telephone number.

25. The method of claim 22, wherein said first network is the Internet.

26. The method of claim 22 further comprising the steps of:
   assigning said first telephone number to said one of said at least one communication line by said telephony server; and
   placing said call on said one of said at least one communication line.

27. A method of providing telephony service, said method comprising the steps of:
   receiving a request for said telephony service for a first telephone number via a first network by a gateway to a second network;
   communicating said request by said gateway to said second network in communication with a telephony server; and
   recording said request by said telephony server, said telephony server being in communication with a telephone switching system, wherein said telephone switching system provides at least one communication line for allocation by said gateway.

28. The method of claim 27, wherein said first network is the Internet.

29. The method of claim 27, wherein said gateway is a virtual private network gateway.

30. The method of claim 27 further comprising the steps of:
   receiving a first message-waiting indication for said first telephone number;

retrieving said request by said telephony server;

informing said gateway by said telephony server of said indication; and sending a second message-waiting indication.

31. The method of claim 30 further comprising the steps of:

receiving said second indication by a communication instrument; and announcing said second indication to by said communication instrument.

32. A business method comprising the steps of:

providing a first network;

providing a gateway in communication with said first network;

providing a telephony server in communication with said first network;

providing a telephone switching system in communication with said telephony server, said system providing at least one communication line for allocation by said gateway; and allowing a user to obtain telephony service on one or more of said at least one communication line via a second network.

33. The method of claim 32, wherein said second network is the Internet.

34. The method of claim 32, wherein said gateway is a virtual private network gateway.

* * * * *